(12) United States Patent
Alink

(10) Patent No.: US 9,394,022 B2
(45) Date of Patent: Jul. 19, 2016

(54) SITTING ASSEMBLY

(71) Applicant: Barbara Elisabeth Alink, Richmond (CA)

(72) Inventor: Barbara Elisabeth Alink, Richmond (CA)

(*) Notice: Subject to any disclaimer, the term of this patent is extended or adjusted under 35 U.S.C. 154(b) by 0 days.

(21) Appl. No.: 14/396,173

(22) PCT Filed: Apr. 23, 2013

(86) PCT No.: PCT/NL2013/050305
§ 371 (c)(1),
(2) Date: Oct. 22, 2014

(87) PCT Pub. No.: WO2013/162362
PCT Pub. Date: Oct. 31, 2013

(65) Prior Publication Data
US 2015/0145293 A1 May 28, 2015

Related U.S. Application Data

(60) Provisional application No. 61/637,816, filed on Apr. 24, 2012.

(30) Foreign Application Priority Data

Jan. 4, 2013 (NL) .................................... 2010082

(51) Int. Cl.
*B62J 1/00* (2006.01)
*A61H 3/04* (2006.01)
(Continued)

(52) U.S. Cl.
CPC . *B62J 1/005* (2013.01); *A61H 3/04* (2013.01); *B62J 1/10* (2013.01); *A61H 2003/006* (2013.01); *A61H 2201/0161* (2013.01); *A61H 2201/1633* (2013.01)

(58) Field of Classification Search
CPC .............. B62J 1/005; B62J 1/06; B62J 1/065; B62J 1/10; A61H 3/04; A61H 2201/1633; A61H 2201/0161; A61H 2203/006
See application file for complete search history.

(56) References Cited

U.S. PATENT DOCUMENTS

| 656,854 A | * | 8/1900 | Nord | ........................ B62J 1/005 |
| | | | | 297/201 |
| 4,541,668 A | * | 9/1985 | Rouw | ...................... B62J 1/002 |
| | | | | 297/201 |

(Continued)

FOREIGN PATENT DOCUMENTS

| DE | 3720368 A1 | 1/1989 |
| DE | 102004020989 A1 | 7/2005 |

(Continued)

OTHER PUBLICATIONS

International Search Report PCT/ISA/210 for International Application No. PCT/NL2013/050305 Dated Jun. 19, 2013.

(Continued)

*Primary Examiner* — Philip Gabler
(74) *Attorney, Agent, or Firm* — Harness, Dickey & Pierce, P.L.C.

(57) ABSTRACT

A sitting assembly is disclosed including a first and a second saddle pad for a transition between a first state and a second state. In the first state, the saddle pad will hang down, such that a user may step over the saddle pad. In the second state, the saddle pad will have a substantial horizontal orientation suitable for sitting. The transition may be a rotation such that the sitting assembly is narrower in the first state than in the second state. A lever may be present for effecting the transition. The sitting assembly is intended for use on vehicles, and is suitably coupled to a frame thereof by means of a saddle pin.

19 Claims, 8 Drawing Sheets

(51) Int. Cl.
 B62J 1/10 (2006.01)
 A61H 3/00 (2006.01)

(56) References Cited

U.S. PATENT DOCUMENTS

| | | | | |
|---|---|---|---|---|
| 5,167,435 A | * | 12/1992 | Aldi | B62J 1/02 297/201 |
| 5,568,958 A | | 10/1996 | Chen | |
| 5,597,202 A | | 1/1997 | Andersen | |
| 6,142,562 A | * | 11/2000 | Varan | B62J 1/005 297/195.1 |
| 6,152,524 A | * | 11/2000 | Cox | B62J 1/002 297/201 |
| 6,705,674 B1 | | 3/2004 | McMahan et al. | |
| 2009/0194142 A1 | | 8/2009 | Zimmerman | |
| 2010/0117426 A1 | | 5/2010 | Strassman | |
| 2010/0263697 A1 | | 10/2010 | Catton | |
| 2011/0067943 A1 | * | 3/2011 | Waita | B62K 1/00 180/311 |
| 2012/0299272 A1 | * | 11/2012 | Liu | A61H 3/04 280/651 |
| 2014/0333102 A1 | * | 11/2014 | Eldredge | B62J 1/02 297/208 |

FOREIGN PATENT DOCUMENTS

| | | |
|---|---|---|
| GB | 191308579 A | 0/1913 |
| JP | 2004105396 A | 4/2004 |
| WO | WO-20070565080 A2 | 5/2007 |

OTHER PUBLICATIONS

Written Opinion of the International Searching Authority PCT/ISA/237 for International Application No. PCT/NL2013/050305 dated Jun. 19, 2013.

* cited by examiner

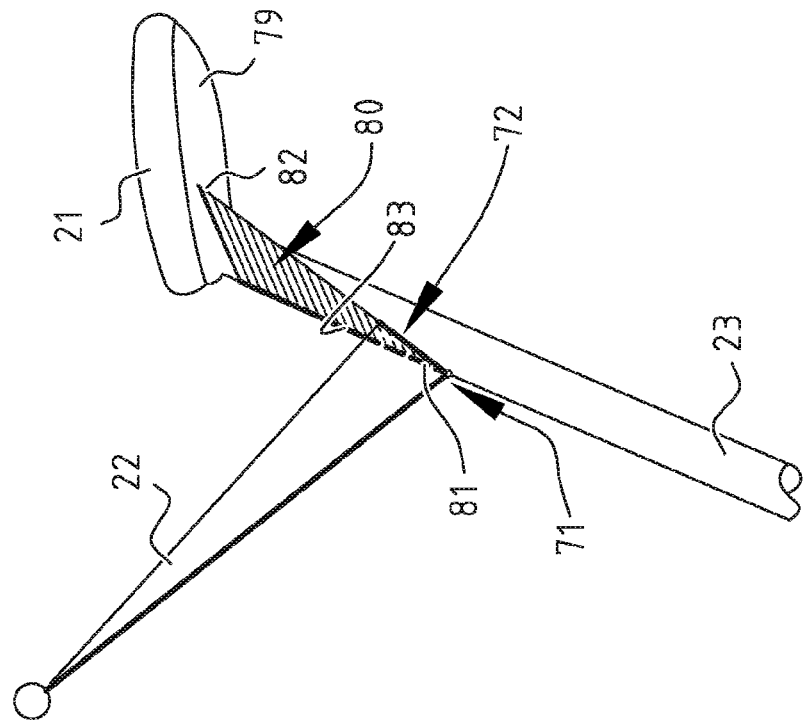
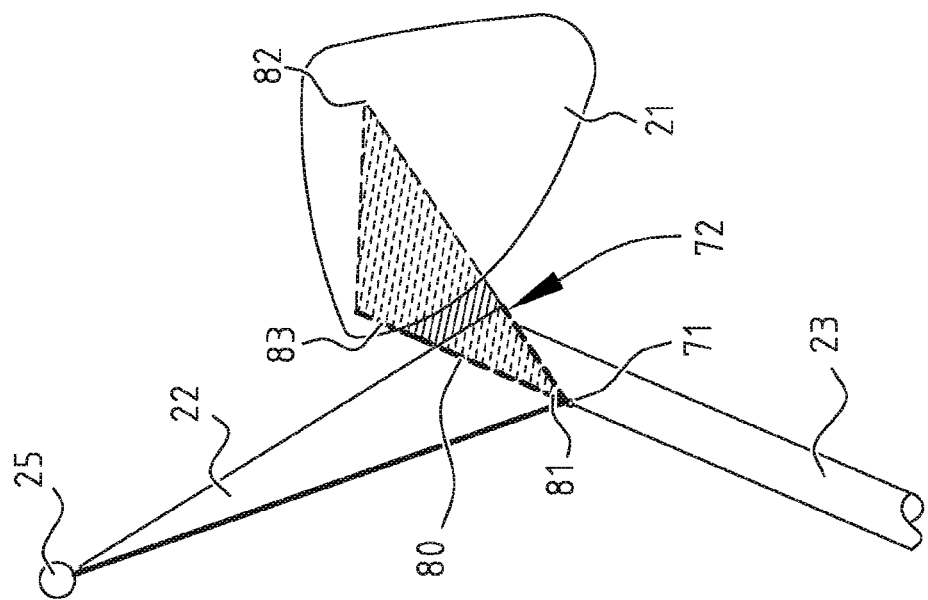
FIG. 7A
FIG. 7B

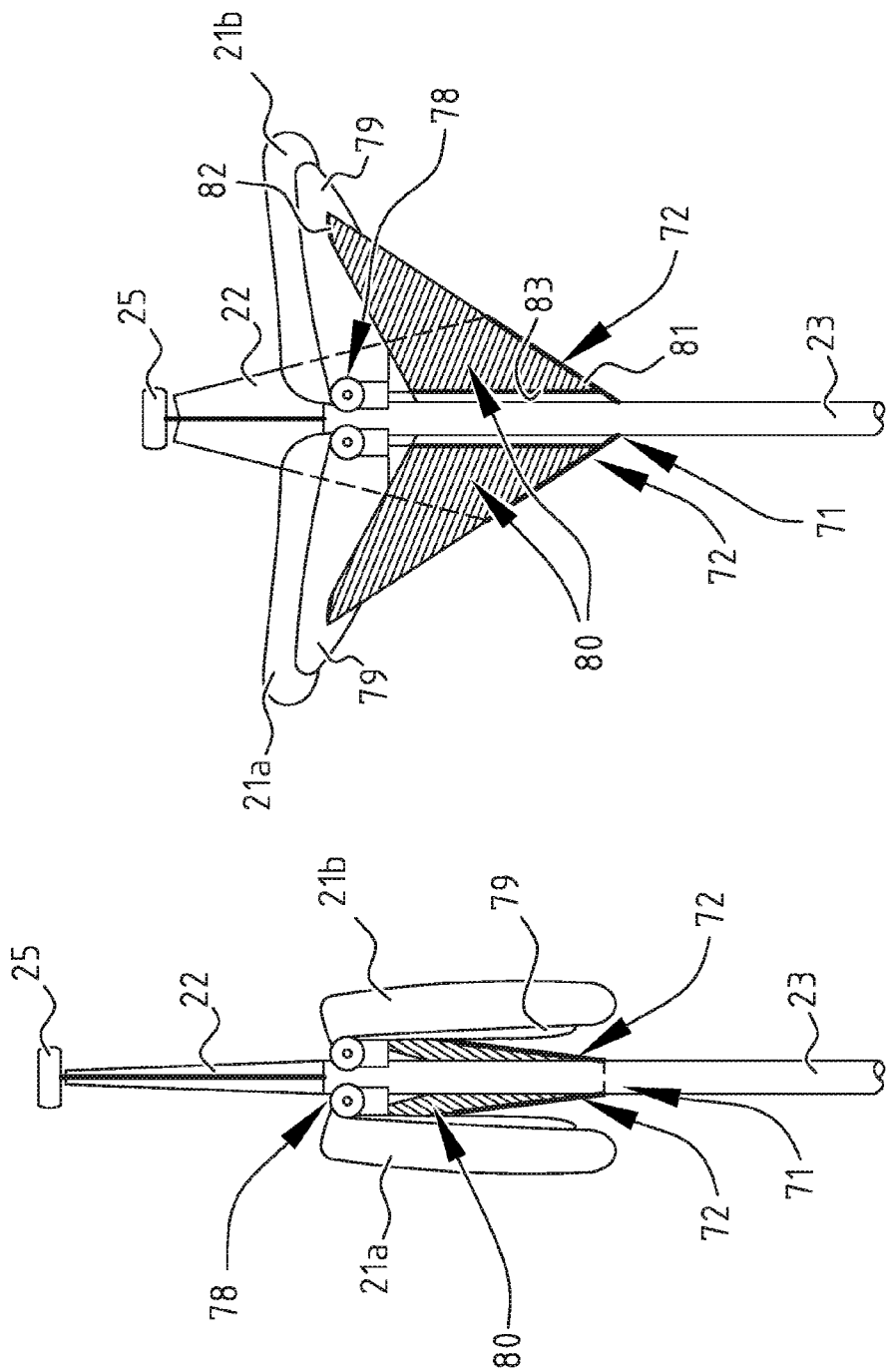

SITTING ASSEMBLY

TECHNICAL FIELD

The present invention relates to a sitting assembly designed for use on a vehicle. According to still another aspect the present invention relates to the use of the present sitting assembly, for instance in a walker device.

BACKGROUND ART

Sitting assemblies such as saddles are generally used in bicycles. Moreover, some walker devices comprise a sitting assembly. A variety of designs exists, dependent on whether the purpose of the bicycle (general use, racing, touring) and the type of person (child, heavy person, sensitive person).

The construction of a sitting assembly is relatively straightforward: it comprises a saddle and at least one shaft through which the saddle may be connected to the vehicle such as a bicycle or walker. The saddle typically comprises an element for sitting and a support structure. The sitting element is typically made of leather or of other fabric and is suitably in the form of a pad. The support structure comprises a frame, which may be provided with elastic elements such as springs for damping out irregularities and providing a convenient support to a user. The frame and/or its connection to the shaft may be made adjustable, such as disclosed in U.S. Pat. No. 5,568,958

Some specific examples of saddles are disclosed in U.S. Pat. No. 5,597,202 and U.S. Pat. No. 6,705,674.

There is however a need for an improved sitting assembly, that is suitable for various vehicles, including walkers and bicycles, and that most beneficially provides both easy access and comfortable support during use.

SUMMARY OF THE INVENTION

The objective of the present invention is, amongst other objectives, to provide an improved sitting assembly, that particularly allows easy access, also for people that are less fit and/or may have problems with walking and/or bending knees.

It is a further object to provide an improved method of mounting on a saddle of a vehicle. This objective, amongst other objectives, is met by providing a sitting assembly according to the appended claim 1.

Specifically, this objective, amongst other objectives, is met by providing a sitting assembly designed for use on a vehicle, provided with a saddle coupled to a hinging means, such that a user may bring the saddle from a first state to a second state, in which first state a user may get onto the vehicle and above the saddle, in which second state the saddle pad is locked and in a position to support a user.

The sitting assembly of the invention is designed for easy access. It allows a user to easily bring his or her body in position above the sitting assembly, without having to lift a leg. When the body of the user is brought above the sitting assembly, the user may bring the saddle to a state wherein the saddle is suitable to support the body weight of the user.

Most suitably, means are present so that a user can choose when such movement of the saddle occurs. The said means may be for manual operation (for instance a handle or lever or hydraulic switch) or for motorized operation.

The access to the sitting assembly may also be from a position behind the saddle, rather than from a position in front of the saddle, as is typical for conventional saddles. The user mounts over the saddle, particularly a fold-up saddle, which when collapsed is narrow and allows easy access. After mounting, the user may lever the saddle pads up and sits down, fully supported. Body weight is now supported by the saddle, so joints and muscles are not burdened, while the device allows complete movement, either walking or even running, all movements being safely controlled by the user.

The sitting assembly is most suitably used in combination with a vehicle that is designed so as a user can easily get onto the device and get off the device. Such a vehicle suitably is provided with a rear frame part that allows the user to approach the vehicle from behind by walking over the rear frame part. When the rear frame part is sufficient low, the user is not forced to lift his legs over the frame of the vehicle.

The mounting onto the sitting assembly, and subsequent use, can be subdivided in following steps. First, the user may approach the sitting assembly from behind by walking over the rear frame part. Evidently, the user could also approach the sitting assembly in a manner conventional for bicycles. This leads thereto that the sitting assembly is placed behind the legs of the user.

Further, in a second step the user mounts on the sitting assembly. The user brings the sitting assembly with suitable means from a first state to a second state, in which the user can sit on the saddle. A user can slightly bend the knees and immediately rest the body on and in contact with the vehicle, for instance a walker device. Thus the present sitting assembly supports the user therewith avoiding burdening of joints and muscles. It also stabilizes users with balance problems or degenerative conditions like Parkinson or MS.

In a third step, the user may start using the vehicle. This use could be cycling. The use could alternatively be a form of walking while continuing to be seated on the sitting assembly. The user could even be running, particularly if a frame of the vehicle enables enough legroom for this purpose. Suitably, the frame is therefore an overarching frame. Hereby the radius of action of user which are fit enough to walk is further improved, since its body weight is supported by the present walker device.

In a fourth step, the user may stop the movement of for instance the walker device. Brakes are suitably present thereto, although in principle this is not required: the user may stop the device with his feet. The rolling resistance may be set so as that the device will easily and immediately stop. It is furthermore expected that the device in a further embodiment may comprise sensors for sensing speed, leg movement and/or leg position, and on the basis of the sensing, automatically activate brakes and/or increase rolling resistance. These governors will be optional depending on user needs.

In a fifth step, after stopping the vehicle, the user may stand up in a natural way. Suitably, the vehicle then remains stabile, for instance by means of at least two front wheels and one rear wheel.

Preferably, the sitting assembly is movable relative to the frame of the vehicle by means of pivoting, rotating or extension. Particularly, the device is equipped with a foldable and/or collapsible saddle, allowing mounting over the rear-end of the vehicle with minimum obstruction.

The movement means of the sitting assembly is most preferably a hinging mechanism. Herewith the movement of the sitting assembly is a rotating movement. Such a rotating movement is a feasible manner of bringing the saddle below the back of the user. When made fit for a particular user, it may be achieved that the saddle is in contact with the user's body already during the last portion of said rotating movement. A further advantage is that a user could ensure the transition for the first state to the second state manually, i.e. by operation of a lever.

In a suitable implementation, the hinging means of the sitting assembly comprises a lever hinging around a saddle pin of the sitting assembly, or alternatively around a support shaft for the saddle. This lever allows a user to bring the saddle from the first into the second state in a manual operation. More suitably, the lever extends to the front side, so that a user can hold the lever, particularly a shaft thereof, after mounting on the walker device or other vehicle.

According to further implementation, the present lever is hinged on the saddle pin by a first and a second lever rod both acting on opposite sides of the saddle pin. The advantage of a double lever rod is that strength structure is obtained.

Additionally, the movement means may be based on a translation, i.e. a saddle pin extending upwards and/or downwards. Obviously, the length of the saddle pin may be set and fixed prior to use, but can be extended with optional hydraulic saddle pin. However, the saddle pin could further be used in combination with a motor. Moreover, it may be advantageous that the saddle just goes downwards, when a user wants to leave the walker device. This could be implemented with a motor, but alternative implementations are feasible. For instance a button coupled to a spring and/or locking means could be present.

Most preferably, the saddle comprises saddle pads each coupled to a hinge, which saddle pads are downwards hanging in the first state, to allow a user to get onto the vehicle. Suitably, the saddle pads are in a substantially horizontal position to support a user in the second state. Thus, the two (or optionally more) saddle pads can be levered into the position to form a saddle on which, after levering the pads into the upright position, the user sits down on.

An advantage of two saddle pads is that the user is supported under the buttocks, rather than having to sit on the crotch (the latter often uncomfortable and not preferred by older people, especially detrimental for men—prostates).

The saddle pads may be exchangeable and can further be custom fitted for the specific needs of the user. The saddle pads support the sitting bones, but do not excerpt pressure on the prostate (men) or private sensitive front parts (women) that saddles normally do. The pads are supporting exactly where they need to support, on the sitting bones, not on soft, sensitive parts whereas regular bicycle saddles are detrimental and uncomfortable.

In the first state of the sitting assembly, the first and the second saddle pad are oriented downwards, for instance vertical, or including an angle between 0 and 45 degrees to a vertical axis. In the second state, the first and the second saddle pad are oriented substantially horizontally, or even upwards, so as to include mutually an angle of between 150 and 180 degrees. A structural advantage of this implementation is that there is no need for movement of the saddle pin of the sitting assembly. Functional advantages include minimizing space in the first state, and a gradual increase of support during the transition from the first to the second state.

In a specific implementation, the saddle or saddle pads thereof rotate along an axis, during a transition from the first state to the second state or vice versa, which axis substantially extends along the first direction. Due to this movement of the saddle or saddle pads, the saddle becomes wider, to generate sufficient support space for a user while sitting on the saddle.

The saddle with saddle pads of this embodiment is suitably supported with a support means for supporting the saddle pads in the second state.

Such support means comprise, in a first version, an arm, of which a first end is coupled to the saddle pad, and of which a second, opposed end is coupled to a lever. This downward movement of the arm results then in downward turning of the saddle, i.e. from the second state to the first state. The first end of the arm is more particularly attached to an outer half of the saddle pad. Such outer half is more preferably a portion of which a perpendicular distance to the central axis of rotation of the saddle pads) is at least 50%, or even at least 60% of a width of the saddle pad in said perpendicular distance. A downwards movement of the lever draws said arm (at least one per saddle pad) downwards.

In this first version of the support means, the lever suitably has a first and a second extension, said first extension being located on a first side of a support shaft for the saddle pads, said support shaft being suitably located at said axis of rotation of the saddle pads. The arm coupled to the first saddle pad is with its second end coupled to said first extension. Similarly, the arm coupled to the second pad is coupled, with its second end, to the second extension, present on a second, opposed side of the support shaft.

Preferably, the lever is provided with a first and a second arm, which mutually enclose an angle between 90 and 180 degrees. This makes that the second arm, not connected to said arms for the saddle pads, may be facing upwards, which is easy for use. Moreover, such upwards orientation of the second arm allows the provision of a lock, i.e. by means of a suitably plate-like locking arm extending between said first arm or said support shaft and the second arm. At the side of the second arm, a cavity or protrusion may be present which defines a locking position for the locking arm. Therewith, it locks the saddle pads in the second state.

As explained before, for its levering operation, the lever suitably hinges relative to the saddle pin, i.e. by means of a pin through the saddle pin or the support shaft or by means of another hinging construction. Hinging on the saddle pin or the support shaft, rather than hinging on a shaft connected to a frame of the vehicle has the advantage that the saddle can be taken off from the vehicle in an easy manner.

In a second version of the support means for the saddle pads, use is made of supporting blades, most suitably one per saddle pad. In use, for going from the first to the second state or vice versa, these support blades rotate, more particularly along an axis substantially parallel to the support shaft for the saddle pads. An outer end of such support blade therewith arrives at a location below the outer half of the corresponding saddle pad. In this second version, said blade is suitably not fixed to the saddle pad, as opposed to the first version. Means may be present for limiting the rotation of the blade, and also locking the saddle pads in the second state. Such means may for instance be suitable structure at a bottom side of the saddle pad (the bottom side being at the bottom when the saddle pad is in the second state). Such a structure may be a protrusion, a protruding plate, a cavity or the like. Furthermore, use could be made of magnets. More specific locking structures as known per se could be applied.

In order to achieve said rotation of the support blades along an axis substantially parallel to the support shaft, the saddle is, in this second version, preferably provided with pushing means with first and second pushing faces. The first and second pushing faces extend on opposed sides of the support shaft and will push or draw a first and a second support blade. This results in rotation of the support blades. Particularly, a single rotation of the pushing means, such as a lever, but alternatively a motorized means, results in the rotation of the first and the second support blades in opposite direction of rotation.

Preferably, said first and second pushing faces are fixed to the first and second support blades. This will stabilize the transfer of force and momentum. Moreover, drawing becomes possible.

More preferably in order to achieve a conversion of the direction from that of pushing means to the rotation, the pushing means suitably rotate along an axis, which preferably extends transversal to the axis of rotation of the support blades. The pushing faces will thus be turned towards or away from the support axis.

Suitably, the support blades have a varying diameter that increases from a bottom portion, onto which the pushing faces act towards a top portion, which is at least partially in contact with the saddle pad when in the second state. Preferably, the support blades are (substantially) triangular. More preferably, the outer end of the support blade is located at one end of the triangular diagonal. The other end of this diagonal is located at or close to the rotation axis of the pushing means.

It seems optimal that the outer end extends upwards in the second state. Such upwards orientation allows a locking in a cavity in the saddle pad.

Preferably, the saddle has a construction, wherein the support shaft does not extend vertically. Preferably, the axis makes an angle smaller than 60 degrees with the vertical, more preferably between 15 and 45 degrees. Such oblique orientation of the support shaft allows an easy upward rotation of the outer end of the support blade. Furthermore, this provides a upward orientation of the pushing means, which is particularly handy if the pushing means are embodied as a lever. Alternatively, the pushing means may be provided with a motor for motorized transition from the first to the second state and vice versa.

In again a further embodiment, the saddle is foldable, so as to extend its width in a transition from the first to the second state. For instance, rather than using a saddle with individual saddle pads, a saddle could be used, wherein the sitting piece is based on a fabric, such as disclosed in U.S. Pat. No. 5,597,202. By means of a suitable movement of the supporting saddle frame, outer ends of the fabric could be moved towards a central axis of the saddle, and again away from this central axis.

Additionally, said saddle pin could be rotated. A combination of such options may also be applied.

The support shaft of the saddle or saddle pads is in a first embodiment the saddle pin. Alternatively, it may be a shaft separate from the saddle pin (more generally referred to in the claims as a top structure). For instance, the saddle could be provided with an interface to a saddle pin, such as conventionally provided in saddles. This interface typically comprises a clamping ring for an upper portion of the saddle pin, and coupled to said ring, a frame. Preferably, the frame may be rotated relative to said ring. Such a rotation allows that the support shaft gets an oblique orientation, whereas the saddle pin would extend vertically. Alternatively, the saddle pin may extend in a direction parallel to a frame of the vehicle, or substantially perpendicular to said frame, so as to obtain maximum stability, while the support shaft is given an orientation that is optimum from the use perspective.

The sitting assembly as herein above described, appears to be useful also for alternative walker devices, or more in general vehicles.

The sitting assembly of the present invention is particularly suitable for use on a walker device, particularly one having an overarching frame, and more particularly having a single rear wheel and a plurality of front wheels.

According to a further aspect, the present invention relates to the use of the present sitting assembly for transporting individuals while the individuals are supported by the walker device.

OVERVIEW OF FIGURES

These and other aspects of the invention will be further elucidated with reference to the figures, which are purely schematical, according to which:

FIGS. 7A and 7B are side views of a further embodiment of the sitting arrangement of the present invention;

FIGS. 8A and 8B are rear views of the further embodiment of the sitting arrangement as shown in FIGS. 7A and 7B.

DETAILED DESCRIPTION OF ILLUSTRATIVE EMBODIMENTS

Figure 1:
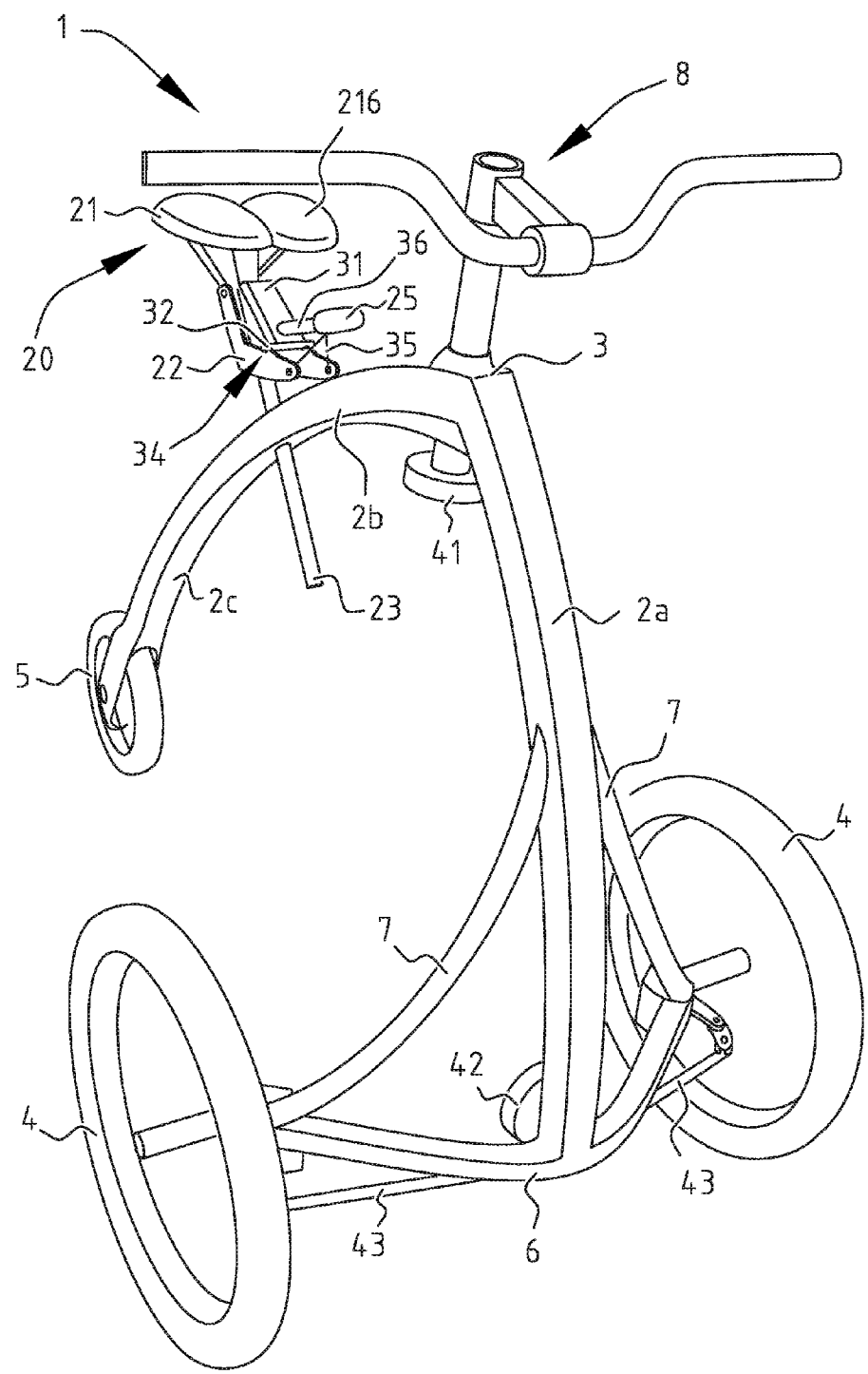
FIG. 1 is a view in perspective of a first embodiment of the present walker device, with the preferred frame structure.

The figures are not drawn to scale, and represent preferred examples of the invention. Equal reference numerals in different figures refer to same or corresponding elements.

The sitting arrangement of the present invention is particularly suitable for use in walker devices. Various types of walker devices exist. A first and main category of walker devices are walkers wherein the user walks behind the walker. This is a type commonly in use by elderly people with reduced body stability that are afraid of falling in the course of walking. A second category of walker devices are wheelchair type walker devices. An example hereof is for instance known from JP-2004-105396. A third category of walker devices are supporting frames used to support a user to rise from a sitting posture to a standing posture. WO2007/056508 describes an example hereof. The sitting assembly is most suitably used in combination with a walker device of the first type. Such a combination is merely known in an implementation wherein a user should turn 180 degrees for arriving at the rest state—i.e. sitting assembly—from the state wherein he or she can walk behind the walker, for instance from DE10 2004 020 989).

In addition to the turning problem, currently available walkers have more drawbacks. In fact, currently available walkers are devices which design has not substantially changed in the last thirty years. The design has drawbacks and principle flaws that pose problems for the users.

For example, the user is not attached to the walker, so when the walker accelerates (i.e. down a slope), creating a distance between walker and user, causing the user to lean forward and ultimately fall.

Further, when losing control of the device, the user would need to find the brakes. Currently most brakes are handles that would need to be grabbed, which requires, when in panic, an anti-intuitive action. When in panic, the user clinches their hands in search for support, the walker separates further from the user, ultimately causing the user to fall. In the US alone there are 40.000 reported cases of incidents with walkers/walking aids per year.

In Canada approximately half of the people who should use some kind of mobility aid are not using available devices due to the stigmatizing character attached with the use of these.

With regard with the walking position, current walkers have the disadvantage that the user has to bend forward, leaning on the handles to find support. This does not promote a healthy posture since users have an arched back and walk hunched over. Further, walkers also require the user to carry their complete body weight when walking, a challenge and risk for brittle osteoporosis patients.

In case a conventional walker has sitting means, they generally can only be used to rest. The user needs to rotate 180 degrees between the handle bars, which may be a challenge to balance.

Accordingly, a problem of the current available walkers is that they are intended for sitting, or for walking. Thereto, the sitting assembly of the invention is most suitably used in a walker device comprising an overarching frame with an overarching top, which frame extends at least primarily in a first direction between a front side with at least two front wheels and a rear side with a first rear wheel. The overarching frame particularly comprises, when seen along the first direction, a fore frame part located before said overarching top, a middle frame part located between said overarching top and the sitting assembly, and a rear frame part located behind the sitting assembly to which the rear wheel is connected, wherein the rear frame part has a height allowing a user to walk over the rear frame part and take place on the sitting assembly, and wherein the middle frame part has a width allowing a user to place his or her legs on either side of the middle frame part.

With this walker device, a new subclass of the first category of walker device is provided enabling a new mode of transportation which is not limited to the disadvantages of the above described categories of conventional walkers. The walker device according to the invention both enables and supports movement of the user wherein the user combines sitting with walking and/or running.

The present invention offers users an ability to move in a new way, combining sitting with walking and/or running. It is a new mode of transportation and not limited to offering an alternative for current walkers. The user mounts on top of the device so the body is resting on and in contact with the device, not just via the handles. The overarched frame allows for the legs to move freely without any obstruction between the lower legs. The user mounts over the saddle, particularly a fold-up saddle, which when collapsed is narrow and allows easy access. After mounting, the user may lever the saddle pads up and sits down, fully supported. Body weight is now supported by the saddle, so joints and muscles are not burdened, while the device allows complete movement, either walking or even running, all movements being safely controlled by the user.

The term 'overarching frame' as used in the present context means that the frame overarches legroom for the user between the present front wheels and first rear wheel. The terms 'front frame part', 'middle frame part' and 'rear frame part' are intended to describe the shape of the frame and do not need to be individual construction elements. Rather, it appears suitable that the overarching frame is—at least substantially—a single construction element. Moreover, the term 'overarching top' is used for expression of a highest area of the frame, which highest area does not need to be a single point, but could extend in the first direction, similar to a bridge.

The present walker device can advantageously be used for walking and/or running while sitting. The user therefore does not need to bend forward, but is supported by the sitting assembly, and typically also his or her own legs. The overarching frame provides legroom to the legs, while a user sits on the sitting assembly. The orientation of the sitting assembly is towards the front side of the walker device, so that a user does not need to turn 180 degrees.

A suitable embodiment of the present walker device is wherein the present middle frame part is higher than the present rear frame part to provide legroom for a walking movement by the user. When the present walker device is in use, the legs of the user are substantially placed under the present middle part. Accordingly, when the middle frame part is higher than the rear frame part, this allows legroom for a walking and even running movement by the user.

Suitably, the middle frame part constitutes a 'structural block' to provide the bearing and rotation part of the steering installation. In case of the cable steering, the middle frame part may comprise, particularly in an inner space, a wheel to rotate the cable. The cable will then run through the front frame part. In case of a rigid steering mechanism, the middle frame part constitutes the structural part for the bearings of the steering.

In a further implementation hereof, the middle frame part comprises a hinge, which allows the frame to be folded for easy storage or transportation. It easily fits in the back of a car.

The present overarching frame is preferably, when seen in a side view parallel to the first direction, an elliptical overarching frame, possibly with all sorts of variations to its shape. An elliptical overarching frame may comprise a part of a circle, as well as other curvatures or sharper bends, angles. The advantage of an elliptical overarching frame is that the rear side of the walking device is low, therewith providing an easy access to the sitting assembly, and the fore part of the walking device high, therewith providing enough leg room for walking and/or running while seating of the sitting assembly.

The principle is that the frame is some form of arched-over structure without any additional connection between the rear frame part and the front frame part.

Furthermore, the present rear frame part suitably extends towards a lower end at which said wheel is located, or wherein the present first rear wheel is placed behind the body of the user for providing a stable walker device, thereby avoiding backwards falling with the walker device.

According to a preferred embodiment, the present walker device comprises an overarching frame wherein the present fore frame part has a width larger than the middle frame part. The advantage of this embodiment is that a stabile walker device is provided, both when the walker device is in use as well as when the walker device is parked.

In a suitable implementation, the present fore frame part preferably comprises a first and a second frame element, wherein the first frame element extends from the middle frame part towards a left front wheel, and wherein the second frame element extends from the rear middle frame part towards a right front wheel. This implementation provides a stable walker device since the width of the walker device is already increasing from the present middle frame part. Alternatively, the fore frame part may be a single construction element, triangulated to/mounted on the horizontal bumper, connection between the brackets holding the rotation part of the steering front wheels.

In other words, in order to provide a stable walker device, the present overarching frame, when seen in a perpendicular top view, has or encloses a substantially triangular shape, wherein its width increases from the first rear wheel to the at least two front wheels.

For reasons of stability, the present fore frame part is suitably connected with the at least two, preferably transversal arranged, front wheels via a transversal, preferably horizontal, rod which extends between the at least two front wheels. The advantage of this transversal rod is that a rigid frame is provided. Further, the present transversal rod may provide a support for the feet of the user, for example when the user is waiting of when the user is riding down a slope. The transversal rod (bumper) might also be used to rest a foot on for users recovering from lower body surgery. It also provides the structure for mounting baggage, storage space for a cane holder, prosthetic leg holder, shopping bag etc.

Preferably, the present walker device comprises supporting connector elements between the transversal, preferably horizontal, rod and the fore frame part. The advantage of these supporting connector elements is that a more rigid frame is provided.

Suitably, the present at least two, preferably transversal arranged front wheels, have a larger diameter than the first rear wheel. The advantage of larger front wheels is that the present walker device can easily handle obstructions such as a curbstone.

In order to provide an easily steerable walker device, the present at least two front wheels and/or one rear wheel are advantageously swivel castors. Swivel castors are easily moveable in desired directions. Optionally, the castors are provided with locking means.

Another advantageous embodiment for a walker device providing support to the user is when the present walker device further comprises a support element at the front side, preferably mounted at the fore frame part that a user may grip with his or her hands.

A most commonly applied steering mechanism for this walker is by means of cables. Cable steering allows a nearly invisible steering, not causing an obstruction and limiting the movement of the legs while striding on the walker. The middle frame part houses a rotation wheel under the steering bar. The rotation wheel rotates when the steering bar is operated by user. The cables transfer the movement to the castors with the front wheels. Rigid cables may be used which can be mounted in the tubing of the frame, or, alternatively, casual brake cables may be used. With use of these cables, horizontal rods are then connecting the castors and transfer the rotation from steering bar to wheels.

In an alternative implementation, the said support element is or comprises a substantially horizontal steering bar with a mounted optional chest pad the users chest rests on, coupled to an optional swivel steering mechanism suitable to actuate the at least two front wheels, which are suitably arranged transversally, i.e. at a distance transversal from a central axis of the overarching frame. Hereby, steering is designed to be operated in an intuitive way which makes it easy to operate for users with limited upper-body strength. Steering is preferably provided by leaning the horizontal steering bar to either the right or the left, as desired. The steering bar is preferably attached to a substantially vertical swivel steering mechanism that transfers either leaning right or leaning left to turning the wheels right or left, respectively.

Preferably, the present walking device is also provided with brakes, which are suitable to slow down the walker device, and/or which are suitable to lock the walker device in a parked position. Most preferably, the brakes are activated by leaning on a pad mounted to the steering bar, an intuitive way of operating, not causing problems for users with compromised fine motor activity in their hands.

Furthermore, the rear wheel suitably has a stationary brake. The rear wheel may further or alternatively be provided with a brake to be operated to slow down and stop instantly.

Figure 2:
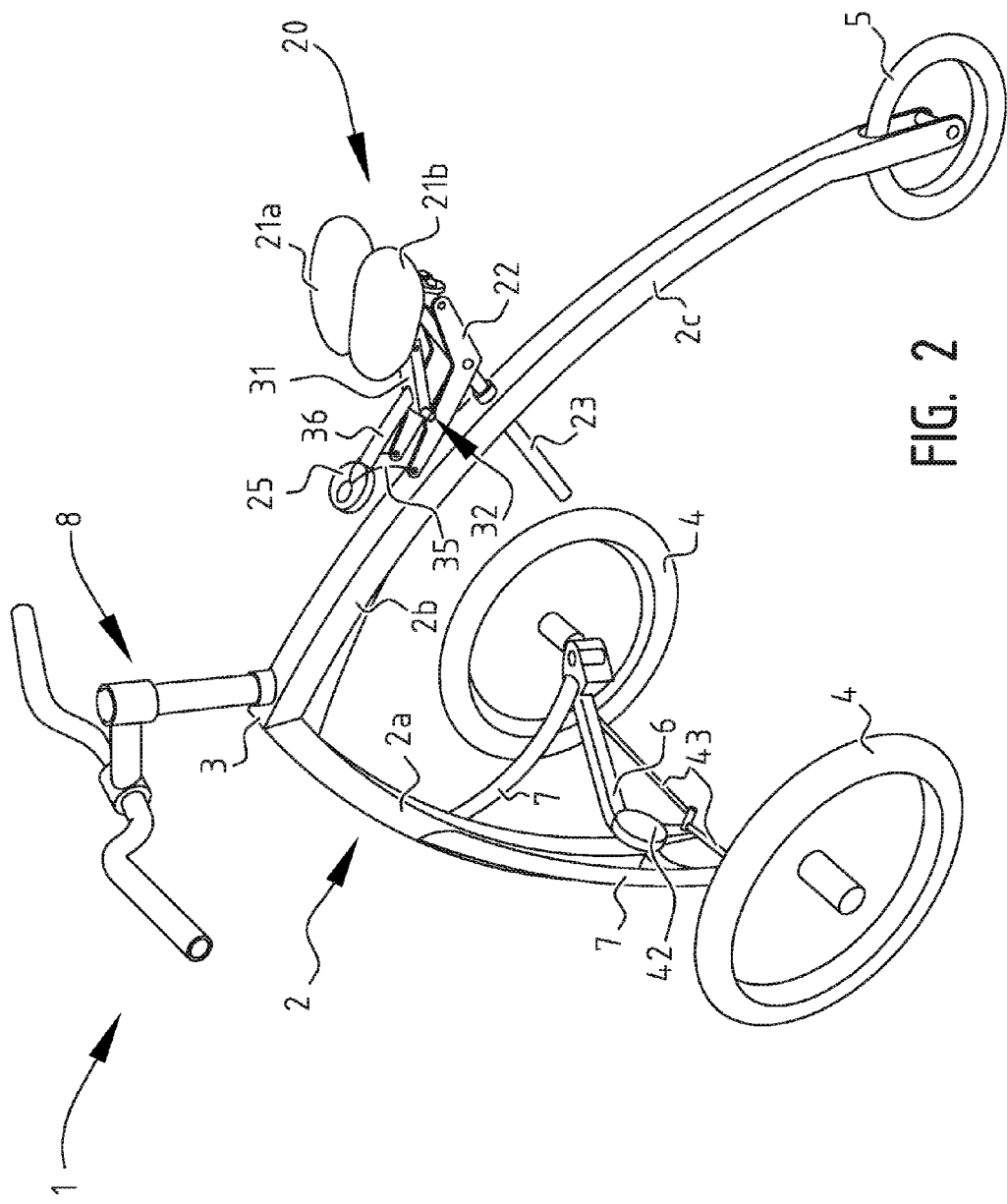
FIG. 2 is another view in perspective of the first embodiment shown in FIG. 1, FIG. 3A and FIG. 3B are a perspective view of the present sitting assembly.

FIG. 1 shows a schematical representation of the walker device 1 in a first embodiment primarily from the front side. FIG. 2 shows a schematical representation of the same embodiment in a bird's eye view. The walker device 1 of this embodiment comprises an overarching frame 2 with an overarching top 3, and a sitting assembly 20 coupled to said frame 2. The frame 2 extends at least primarily in a first direction between a front side with at least two front wheels 4 and a rear side with a first rear wheel 5. The at least two front wheels 4 are transversally arranged, i.e. they are located at a distance from a central axis of the frame 2 along the first direction. In this embodiment, the two front wheels 4 constitute the front corners of the device. The frame 2 comprises, when seen along the first direction, a fore frame part 2a located before said overarching top, a middle frame part 2b located between said overarching top and the sitting assembly 20, and a rear frame part 2c located behind the sitting assembly 20 to which the rear wheel is connected. A support element 8 extends in this embodiment from the overarching top 3. The support element 8 comprising a steering bar, which is coupled to actuating means of the wheels in a manner known per se for a vehicle engineer, such as a bicycle construction specialist. The steering functionality is however not deemed essential for the invention; in a most simple implementation, steering functionality may be absent, and a user may achieve steering by means of his or her feet and/of slight pushing or lifting of the front frame part. In accordance with the invention, the overarching frame 2 extends from the front side to the rear side, particularly to the first rear wheel 5 and overarches a legroom for the legs of a user. The rear frame part 2c has a height allowing a user to walk over the rear frame part and take place on the sitting assembly 20. The middle frame part 2b has a width allowing a user to place his or her legs on either side of the middle frame part 2b.

In the embodiment as shown in FIG. 1, the overarching frame 2 essentially comprises two construction elements, i.e. the front frame part 2a and a combination of the middle frame part 2b and the rear frame part 2c. A hinge (not shown) may be present in the middle frame part 2b, allowing the frame to fold up and be stored or more easily transported. The width of the overarching frame 2 is substantially uniform, i.e. shaft-like. Alternative embodiments are however feasible. For instance, a double overarching frame may be chosen (as in FIG. 4). This is effectively a frame construction with a first and a second element adjacent to each other, wherein the first element extends more or less from the sitting assembly to the left front wheel and the second element extends from the sitting assembly to the right front wheel.

Figure 4:
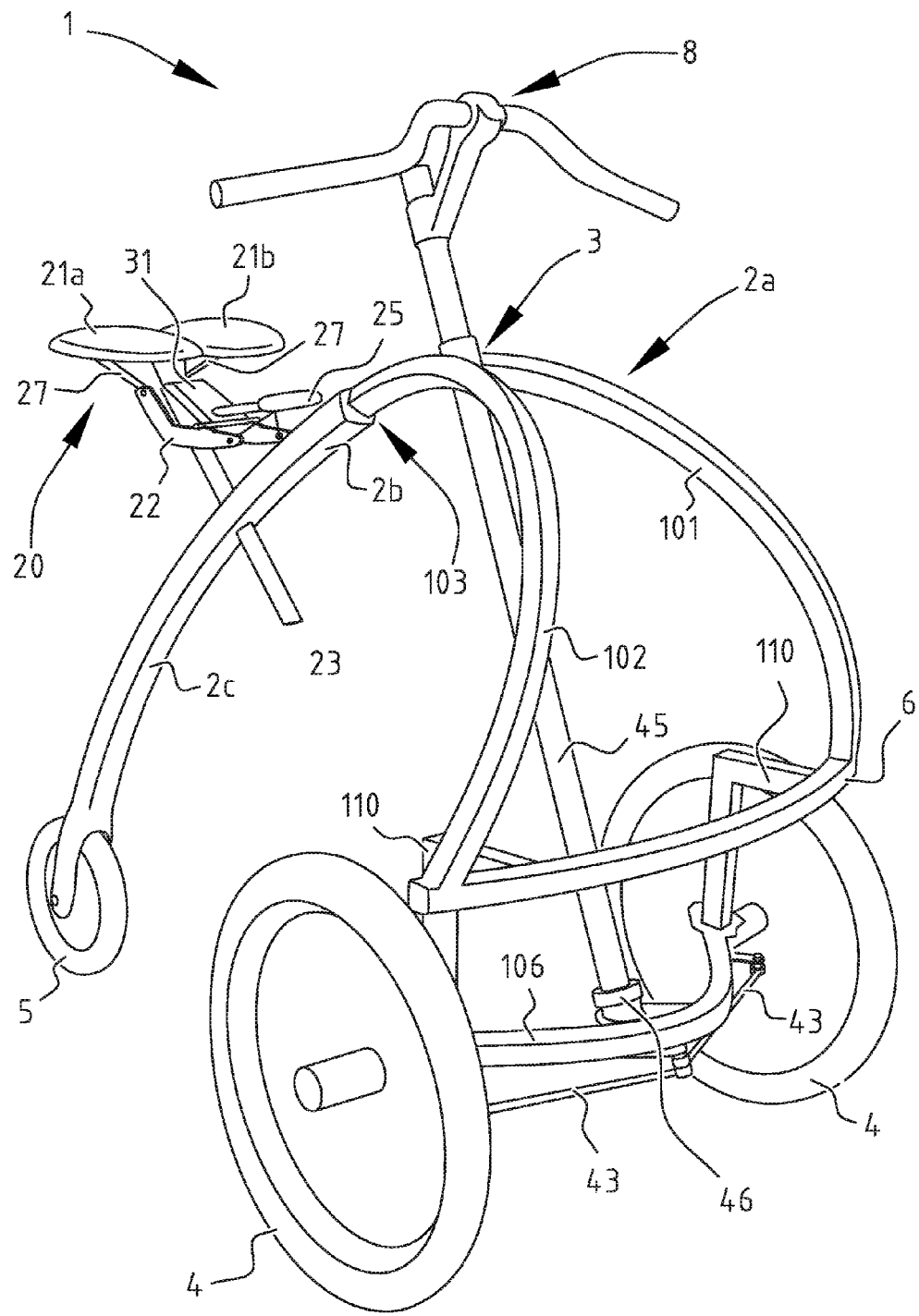
FIG. 4 is a view in perspective of another embodiment of the present walker device.

In the second embodiment of FIG. 4, the front frame part 2a comprises a first and a second frame element, extending from the middle frame part 2b. The connection point of these first and second frame elements to the rear frame element may be provided with a hinging mechanism. The first frame element extends from the middle frame 2b part towards a left front wheel. The second frame element extends from the middle frame part 2b towards a right front wheel. The end of said first and second frame elements is however not connected directly to any of the front wheels, as can be seen in FIG. 4. Rather, a connecting rod is present between the first and the second frame element. This connecting rod is again connected to a mechanical support structure comprising a further horizontal rod and some further connecting shafts. The frame of this embodiment has, when seen in a top view, a substantially triangular shape, which is good for stability. Moreover, in this manner space is created between the first and the second frame element, which could be used for a luggage carrier. The horizontal rods in this embodiment are curved, and are suitable as a bumper. Optionally, these are thereto provided with a rubber element. The support element 8 is in this element a steering construction that is provided with a separate shaft.

The sitting assembly 20 implemented in the first embodiment is provided with two saddle pads 21 coupled to a hinge 22, such that a user may bring the saddle pads 21 from a first state to a second state. In the first state, a user may get onto the vehicle and above the hanging down saddle pads. In the second state, the saddle pads are locked and in a substantially horizontal position to support a user. Hereby, the present walker device 1 provides an easy access to the user, since the saddle pads 21 are in a downwards orientation (FIG. 3B), when the sitting assembly 20 is in its first state. This downward arrangement of the saddle pads allows the user to walk by the saddle pads without lifting his or her legs. Accordingly, elderly have an access to the walking device without performing risky caprioles.

Figure 3A:
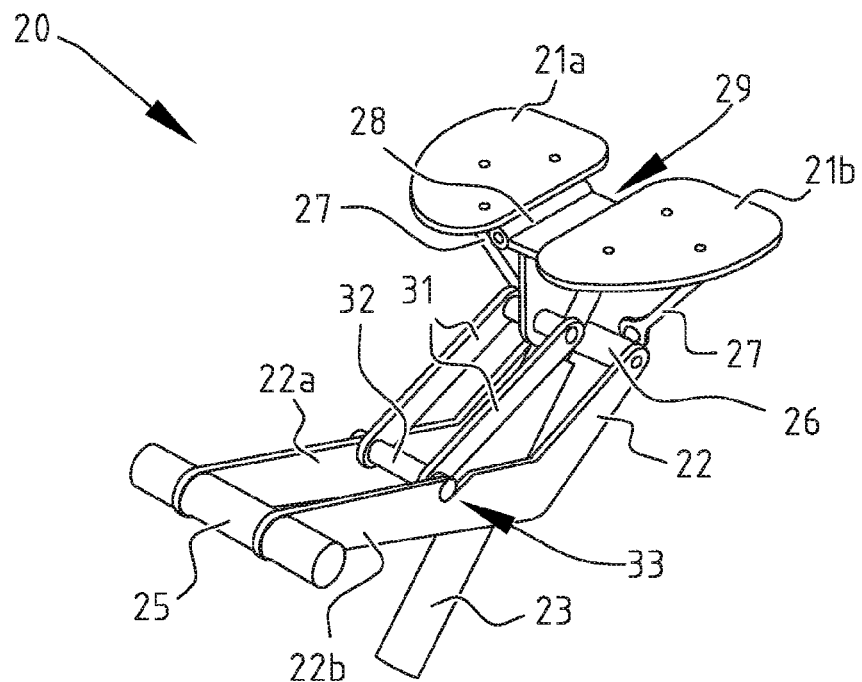

When the user is situated above the sitting assembly 20, he can bring the sitting assembly into the second state. Then, the saddle pads are brought to a substantially horizontal position allowing the user to sit on the sitting assembly 20 (FIG. 3A). Since the sitting assembly 20 comprises two independent saddle pads 21, the user is supported on its buttocks instead of its crotch, thereby providing a more comfortable position. Further, the present walking device 1 with sitting assembly 20 allows the user to sit while moving forward or backward by using the legs. The overarching frame 2 provides the user enough room to move its legs for moving, while its body weight is supported by the sitting assembly 20 and walking device 1.

As is apparent from the FIGS. 1, 2 and 4, the sitting assembly 20 is coupled with a saddle pin 23 to the overarching frame 2. This saddle pin 23 suitably extends backwards in space. This is very advantageous so as to create sufficient distance between the saddle pad 21 and the support element 8 at the front side. Moreover, this results in a walker device, wherein the saddle pad 21, when in the sitting state, is suitably at a height substantially equal or lower than the overarching top 3. Most suitably, as shown in the said figures of the first and the second embodiment, the saddle pin 23 extends at least largely perpendicular from the overarching frame 2. This is deemed beneficial from a construction perspective. While not indicated in the figures, it is not excluded that further supporting shafts may be coupled between the overarching frame 2 and the sitting assembly 20.

Further is shown in FIGS. 1, 2 and 4, that in use the first rear wheel 5 is placed behind the body of the user for providing a stabile walker device as well as narrow mounting/walk-over access. When the user is situated on the sitting assembly 20, the weight of the user is distributed by the overarching frame 2 towards both the rear wheel 5 and front wheels 4, thereby providing a stabile configuration, which avoids falling backward or forward.

Further is shown in FIGS. 1 and 2 that the fore frame part 2a is connected with the at least two transversal arranged front wheels 4 via a transversal, preferably horizontal, 'bumper'/rod 6 which extends between the at least two transversal arranged front wheels 4. This results in a rigid connection between the overarching frame 2 and the front wheels 4, thereby providing a stabile walking device 1. Further are shown supporting connector elements 7 between the transversal, preferably horizontal, rod 6 and the fore frame part 2a. These connector elements 7 contribute to the rigidity of the present walking device 1. Elements 7 can also house the rigid steering cables in this option of a nearly invisible steering mechanism.

In the embodiment shown in FIG. 4, the front frame part 2a comprises a first and a second frame element 101, 102. The first and second frame element 101, 102 are connected to a rear portion at the connection point 103. This connection point is located within the frame middle part 2b between the sitting assembly 20 and the top 3 of the overarching frame. The connection point 103 comprises most suitably a hinging mechanism.

The first and second frame elements 101, 102 are mutually coupled at the front side by means of the connecting rod 6. This rod 6 also has a bumper function and may be provided with a rubber-elastic material so as to improve elasticity. Whereas the connecting rod 6 of the first embodiment shown in FIGS. 1 and 2 provided a direct connection to the front wheels 4, the rod 6 of this embodiment is particularly relevant for stability and robustness. Moreover, this rod 6 may be placed more at the front side of the walker, therewith creating space for an additional luggage container or the like at the front side. The rod 6 is coupled to a second connecting rod 106 via one or more connecting structures 110. Alternative implementations wherein either one of the—first—and second connecting rods 6, 106 would be left out, may well be elaborated by a skilled person.

In the embodiment shown in FIGS. 1 and 2, the steering bar 8 is coupled to the front wheels 4 via a cable mechanism. The cable is hidden within the frame, particularly the fore frame part 2a and the middle frame part 2b, extending between a first rotating wheel 41 and a second rotating wheel 42. The first rotating wheel 41 is coupled to or present within the frame middle part 2b. It transforms movement of the steering bar 8 into cable movement. The second rotating wheel 42 transfers movement of the cable into movement of the steering connector rods 43 coupled to the front wheels 4.

In the embodiment shown in FIG. 4, an alternative steering mechanism is used. In this FIG. 4, a first and second frame element 101, 102 are used. Therefore, the movement of the steering bar 8 is less easily transferred to the wheels by means of a cable. A solution is found in the use of a shaft 45 and a steering arm 46 coupled thereto at a bottom side. The shaft 45, or more preferably a shaft hidden in a fixed encapsulation, transfers the rotation of the steering bar 8 to the steering arm 46. This steering arm is coupled via the connector rods 43 to the front wheels. This steering mechanism fits well with the double arched frame with the first and second frame element 101, 102, since the shaft 45 may be supported between the first and second frame elements 101, 102.

Figure 5:
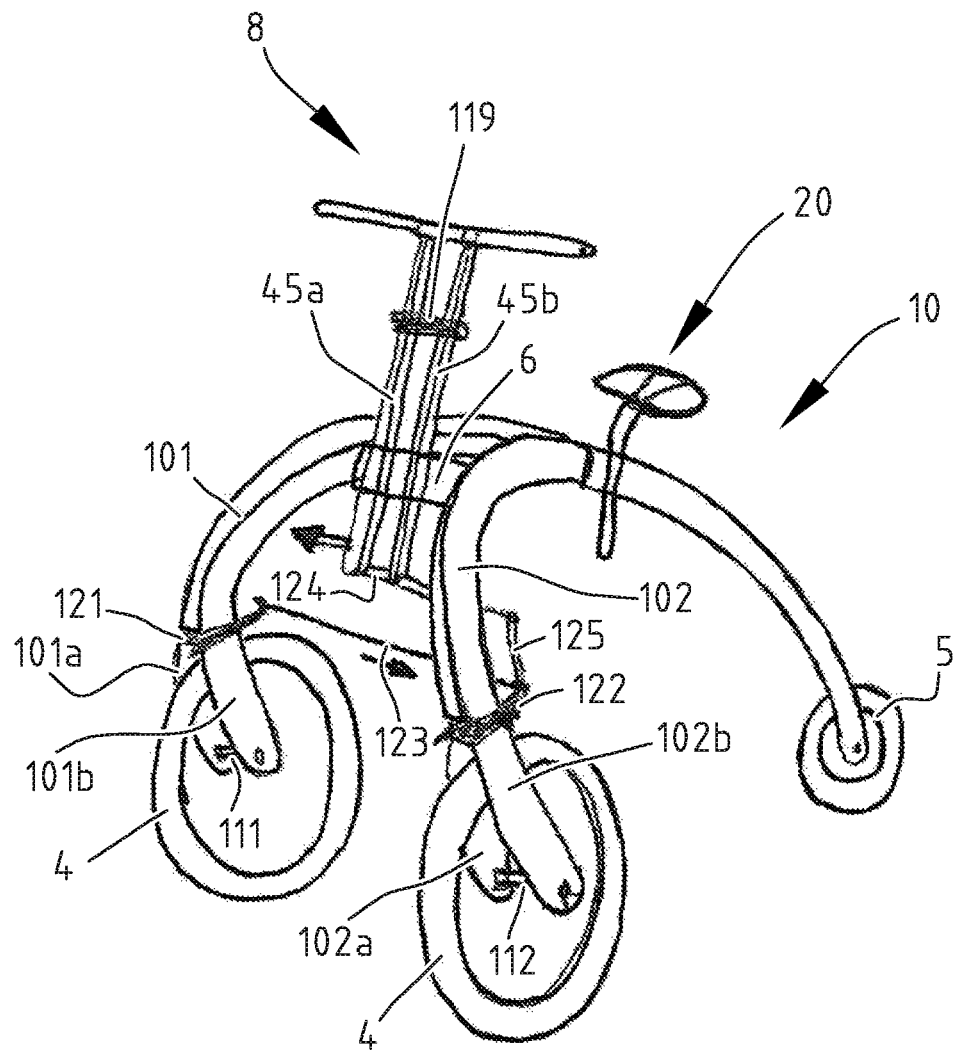
FIG. 5 is a perspective view of a third embodiment of the walker device, with an alternative frame structure.

A third embodiment is shown in FIG. 5. This third embodiment differs from the second embodiment in FIG. 4 with respect to the construction of the fore frame part 2a, and in relation to the steering mechanism. The walker of this embodiment has an overarching frame 10 with a first and a second frame element 101, 102 at its front side. The frame elements 101, 102 are coupled with a connecting rod 6, which is located in this embodiment close to the top of the overarching frame 10. The resulting construction is very simple. Moreover, in this embodiment, the frame elements 101, 102 effectively extend to the front wheels 4, and hold the wheels in a fork-shaped extension: the first frame element 101 extends to the first front wheel with an extension having fork elements 101a, 101b, wherein the wheel is connected thereto by means of shaft 111. Similarly, the second frame element 102 extends to the second front wheel, extending into a fork with fork elements 102a, 102b, wherein the wheel is connected thereto by means of shaft 112.

The steering mechanism of the third embodiment is a so-called swivel steering mechanism. Key elements are the bearings 121, 122 which are present between the first and second frame elements 101, 102 on the one hand and the fork-shaped extensions thereto (101a, 101b, 102a, 102b) on the other hand. These bearings 121, 122 allow a rotation of the wheels relative to said frame elements 101, 102. In a more specific implementation as shown in this FIG. 5, the rotation of the bearings 121, 122 is governed via a plurality of shafts and rods 45a, 45b, 124, 125, 123. When the steering bar 8 is pushed to the right side (in the figure), the shafts 45a, 45b, will rotate relative to the connecting rod 6. A lower end of the shafts 45a, 45b coupled to rod 124 is therewith moved in the opposite direction, i.e. the left side (see the arrow). Shaft 125 will then rotate around its center, such that its bottom side goes again to the right side. Correspondingly, the rod 123 will move to the right side, resulting in rotation of the bearings 121, 122. Pin 119 further ensures that the shaft 45a, 45b is limited to a rotation within the plane of the shafts 45a, 45b and the connecting rod 6.

Figure 6:
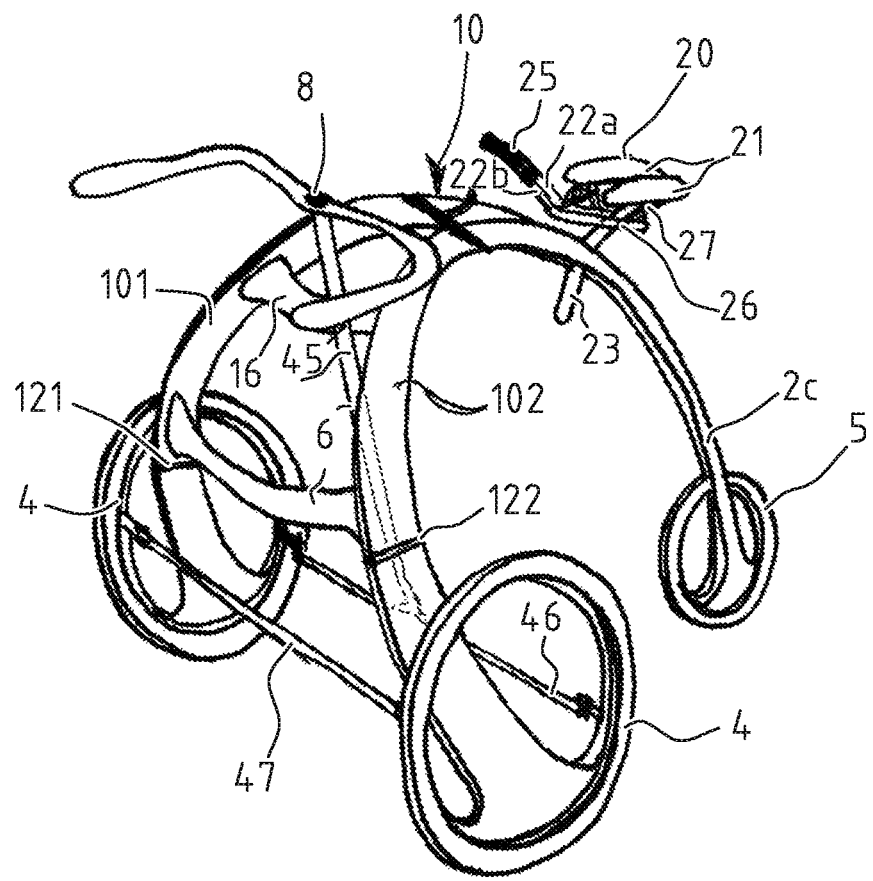
FIG. 6 shows a fourth embodiment of the walker device.

Again a further embodiment is shown in FIG. 6. This embodiment is similar to the third embodiment of FIG. 5, in that it has a first and a second frame element 101, 102, splitting up at or near the top of the overarching frame. The frame elements 101, 102 are mutually coupled with a connecting rod 106 and with an auxiliary connecting rod 16. The steering mechanism of this embodiment comprises a steering bar 8 that is coupled via a shaft 45 and a connecting rod 46 to the wheels. Just above the front wheels 4, the frame elements 101, 102 are interrupted by a horizontal bearing 121, 122, which allow the wheels 4 to turn independently of the frame 10. The front wheels 4 are higher than the rear wheel 5, such that the center of the front wheels 4 is higher than for example a curbstone. This makes the transition from sidewalk to street and back to the sidewalk easier for the user. The front wheels are for instance 10" (25 cm) diameter or larger.

The walker device of this embodiment can be equipped with swivel/rotating wheels (castors, like on shopping carts but then larger) in the front, which enables easy manoeuvring, or in the more specialized version, be equipped with a complete steering mechanism, whereby both front wheels remain connected to the frame as is, but can each rotate as determined by the swiveling steering handle bar 8, that through the steering house or shaft 45 connects the wheels 4 with the horizontal, parallel steering mechanism 46, 47. The steering of the Walker device in the embodiment of FIG. 6 is designed for an intuitive way of moving. When the user wants to go right, the user "leans" the steer 8 to the right. The rolling point of the wheels is off centre, but not at the lowest point. The horizontal steering bar 8 is mounted on top of the vertical steering house or shaft 45 with an adjustable tightening bolt. The vertical steering house is hinged on the top frame, auxiliary connector 16, such that when the steering bar 8 is pushed to the right, the bottom part of the steering house or shaft 45 swivels to the right. The bottom of the steering house is connected to the horizontal connectors 46, 47 between the front wheels 4. The front wheels may be spoke-less wheels. The roller on the bottom of the fork of the frame is attached to the inner rim, the outer rim runs through the roller. This way the gravity point is low, but the larger wheel allows to go over larger obstacles like curbs. However it can also be equipped with regular wheels.

The brake mechanism is based on safety and easy to use for people with limited fine motor in their hands, in a suitable embodiment. When leaning on the steering bar 8 forward, the roller on the wheels 4, start touching the outer rim of the wheels. That friction slows it down. The more weight you put forward the harder it brakes.

Alternatively, when equipped with regular wheels, the brake activates similarly by moving the steering bar forward. When an older person is tired, or panics, it just leans forward and comes to a standstill. For parking the walker device, the rear wheel suitably has a stationary brake. Hence, it can be locked so the person can walk off the Walker device and transition to a seat, then swing the Walker out of the way.

Further is shown in FIGS. 1, 2 and 4 that the fore frame part 2a is higher than the rear frame part 2c to provide maximum legroom for a walking movement by the user. Hereby, damaging of the legs by collision with the walking device 1 is avoided.

Supporting and steering is further provided by support element 8 at the front side, which support element may be gripped by a user with his or her hands. The support element 8 comprises a substantially horizontal steering bar mounted on a rotating wheel transferring the steering action via the cables to the wheels.

Alternative swivel steering for special users has a substantially vertical swivel steering mechanisms suitable to actuate the at least two transversal arranged front wheels.

The FIGS. 1, 2 and 4 further show that the at least two front wheels 4 have a larger diameter than the first rear wheel 5, thereby providing a safe drive without being stopped by small obstacles.

Figure 3B:
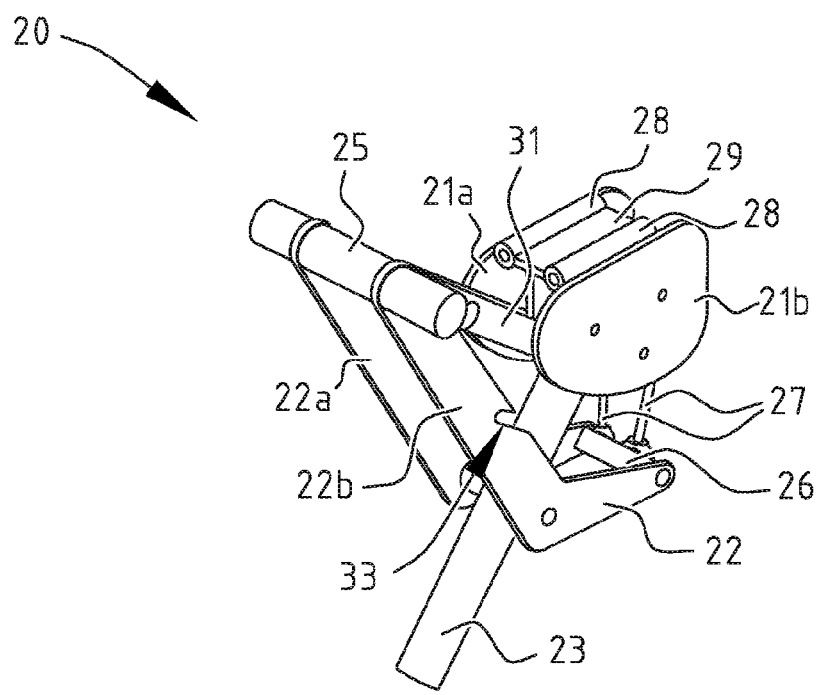

Referring now to FIG. 3, FIGS. 3A and 3B show a sitting assembly 20 according to the present invention, provided with a saddle 21 having a first and a second saddle pad 21a, 21b. Rather than two saddle pad 21a, 21b, one saddle pad could be present, which suitably hinges upwards at the rear side. Three saddle pads, or other options are not excluded.

The saddle pads 21a, 21b are rotatably fixed to a supporting element or top structure 29, which is connected to a saddle pin 23 of the sitting assembly 20. With this saddle pin 23, the sitting assembly 20 is connected to the overarching frame 2. The rotatable fixation is for instance a hinge 28 and allows that each saddle pad 21a, 21b is moved from a substantially vertical position to a substantially horizontal position, or vice versa. This occurs when the sitting assembly is brought from its first state to its second state.

The sitting assembly 20 is further provided with a hinging mechanism, according to which a lever construction 22 rotates around or hinges on an axis located on the lever, for instance halfway, or more generally at a position between 30% and 70% of the lever length. This axis is embodied in an element, which extends through or is directly connected to the saddle pin 23. The end of the lever construction 22 is coupled to extenders 27 to the bottom side of saddle pad portions 21a, 21b. Thus, when the lever 22 is pushed downward, particularly at its haft 25, the opposite end of the lever 22 goes upward. The extenders 27 then go upward and outwards to bring the saddle pads from a substantially vertical position to a substantially horizontal position.

In order to fix the saddle pads in their latter position, a lock is provided. This lock is a mechanical lock in the embodiment shown in FIG. 3 and comprises an arm 31 with a locking pin 32. Upon transition from the first to the second state, the locking pin 32 glides downwards along a surface of the lever 22. It ultimately arrives at a locking cavity 33, into which it falls, thus locking the sitting assembly. By pushing the haft 25 of the lever 22 further downwards, or pulling arm 31 upwards, the saddle unlocks. Saddle pads 21a and 21b return to the first state and the user can easily dismount.

In order to have a most effective use, the lever 22 comprises in this embodiment a first and a second lever arm, that are mutually angled at or near the saddle pin. Thereto, they mutually include an angle of 90-180 degrees, preferably 120-150 degrees. This two-arm construction enables that the haft 25 of the lever 22 is sufficiently upwards in the first state. This allows an easy and forceful grip of a user. The lever construction is furthermore provided with a left lever rod 22a and a right lever rod 22b. This double construction is deemed beneficial from constructional point of view. It moreover easily allows that the saddle pin 23 extends between the left and right lever rod 22a, 22b.

In the shown embodiment, the lever rods 22a, 22b are mutually connected at an end through a rod-end connector 26. Extenders 27 connected to said rod-end connector 26 extend under the saddle pads 21a, 21b. The connection point of the levers 22a, 22b and the connector 26 and the extenders 27 move upwards when bringing the sitting assembly from the first state to the second state. The extenders 27 also move outwards, so that they each end up near to the bottom and suitably an edge of a saddle pads 21a, 21b and provide optimum support. Thereto, these extenders 27 are suitably provided behind the lever rods 22a, 22b.

The operation is as follows:

In FIG. 3B the sitting assembly is shown in its first state with the saddle 21 folded or at least not obstructing movement of a user. The saddle comprises in this embodiment saddle pads 21a, 21b, which are hanging down in the first state. A user may get onto the vehicle and above the saddle pads 21a, 21b. Subsequently, the user may bring the sitting assembly into the second state, wherein the saddle pads 21a, 21b extend substantially horizontal or even slightly upwards, as shown in FIG. 3A. This is done by using the lever 22, for instance the haft 25 thereof. In this second state the saddle 21 is locked. Particularly, when pushing the lever mechanism down, the lock comes down and locks the lever into place once the saddle has come to full extension. Upon dismounting from the saddle pad (i.e. leaving the vehicle), the lever can be 'unlocked' by pulling the arm 31 up, out of the "lock" position. Automatically, this will lower the saddle pads and elevate the lever 22, allowing easy dismounting. More specifically, in the shown implementation, the lock is effectively a locking lever arm 31 gliding downwards along a surface of the levers 22a, 22b, when the lever haft 25 is pushed downwards by a user. A pin 32 of the locking lever arm 31 then falls into a cavity 33 in the levers 22a, 22b. This constitutes the lock. The locking lever arm 31 is suitably connected with its opposite end at a hinge in the saddle assembly, for instance a rod between ends of the levers 22a, 22b.

Pads are exchangeable and can be custom fitted for various users. The pads are separately mounted on and snapped in place in the two hinging plates of the saddle mechanism.

While the shown embodiment comprises a left lever 22a and a right lever 22b, this could alternatively be implemented with a single lever. A connecting rod is then not necessary, and the extenders 27 could be connected to the lever 22 directly.

FIGS. 1 and 4 moreover show a second embodiment of the sitting assembly. Herein, the haft 25 is connected to the lever arm 31 via shaft 36 and coupled via rotatable wires 35 to an end of the lever 22. This embodiment has the advantage that a user can with a single haft 25 operate the lever 22 and ensure locking and particularly delocking of the locking pin 32. A further feature of this second embodiment is the replacement of the locking cavity 33 with a protrusion 34. When bringing the lever 22 downwards for a transition from the first state to the second state, the locking pin 32 will glide on the surface of the lever 22 and pass over the protrusion 34, so as to become locked. A cavity could be made, but does not appear necessary. It appears that the dimensions of the locking arm 31 and the lever 22, as well as the location of the protrusion 34 anyhow fix the position of the locking pin 32 in the said locking position.

In summary, the present invention provides a sitting assembly for easy access, which suitably comprises a hinge with a saddle, preferably comprising a first and a second saddle pad for a transition between a first state and a second state. An advantage of the present sitting assembly is that it enables easy access to the sitting assembly since the user can walk over the saddle in the first state without having to lift a leg or stretch out the feet to stand on the ball of the feet to raise the crotch. A further advantage resides in an ergonomic support during walking. Neither movement of the hips under pressure is required, nor is any pressure on the crotch excerpted.

The sitting assembly of the invention allows for natural strides due to absence of obstruction between the legs, and just support the sitting bones in the buttocks. It is most suitably used in combination with a walker device comprising an overarching frame with an overarching top, which frame extends at least primarily in a first direction between a front side with at least two front wheels and a rear side with a first rear wheel. The frame has a rear frame part and a middle frame part. The rear frame part has a height allowing a user to walk over the rear frame part and take place on the sitting assembly. The middle frame part has a width allowing a user to place his or her legs on either side of the middle frame part.

FIGS. 7A and 7B show the sitting arrangement according to a further embodiment of the present invention in a side view. FIGS. 8A and 8B show the same sitting arrangement in a rear view. FIG. 7A and FIG. 8A show the sitting arrangement in the first state, with the saddle pads 21a,b hanging downwards. FIG. 7B and FIG. 8B show the sitting arrangement in the second state, with the saddle pads 21a,b in a substantially horizontal orientation. These Figures show particularly the support means. Since the support means for the first and second saddle pads 21a, 21b are substantially identical or at least corresponding, these have not been separately indicated in these Figures for sake of simplicity.

The saddle pads 21a, 21b herein able to rotate around hinge 78. In this manner, they can be going from the first state (FIG. 7a, 8a) to the second state (FIG. 7b, 8b). The saddle pads 21a, 21b are provided, in this example with a frame layer 79. An elastic layer—not indicated separately—is present thereon, so as to provide a saddle pad that is suitable for sitting.

In accordance with this embodiment, the support means comprise support blades 80. The support blades 80 are coupled at their (inner) side 83 to a top structure of the saddle pads 21a, 21b. This top structure is preferably a support shaft. In the shown implementation the saddle pin 23 is used as a support shaft. Alternatively, a separate support shaft is provided. This has the advantage that the saddle including support shaft may be taken off from the saddle pin. The shape of the support shaft is open to further design. If desired, a double shaft could be applied as well.

The support blades 80 of the shown example are plate-like, with a triangular shape. The blades 80 are provided with an lower end 81 and an upper end 82. A diagonal extends between said lower end 81 and said upper end 82. Hence, a diameter of the blade 80 increases from the lower end 81 to the upper 82. This is beneficial in order to support the saddle pad 21a,b in a proper manner at the upper end 82, particularly at an outer half of the saddle pad 21. The use of a blade furthermore has the beneficial effect that the saddle pad may be supported over a longer distance across its width, as is clearly shown in FIG. 8B.

At the lower end 81, a pushing face 72 of pushing means, in this example embodied as a lever 22, is coupled to the support blade 80. In this example, the coupling is fixed. The pushing faces 72 extend on opposite sides of the saddle pin 23, and are extensions to the lever 22, similar to extensions shown in previous figures. Its end is thus in essence V-shaped. When the lever 22 is pushed downwards, a rotation occurs around hinge point 71, with the result that pushing face 72 will be rotated to an orientation more corresponding to the support shaft 23. Because the support blades 80 are fixed to said pushing faces 72, the lever 22 actually draws the support blades 80 at their lower end 81. As a result, the support blades will turn around the axis corresponding to their inner side 83.

In the present example, the support shaft 23 has an oblique orientation, as best seen in FIG. 8A, 8B. The angle thereof is about 25 degrees, and may vary. Such an orientation provides a suitable orientation of the lever 22. Moreover, it facilitates the support of the saddle pads 21, 21b, in that the outer end 82 of the blades 80 extends into the frame layer 79 in the second state. The outer end suitably extends in a cavity created thereto. This ensures a locking of the saddle pad 21 in the second state.

The invention claimed is:

1. A sitting assembly designed for use on a vehicle, comprising:
   a support shaft; and
   a saddle coupled to a hinging unit, the saddle being movable between a first and a second state, wherein, in the first state, a user may get onto the vehicle and above the saddle, wherein, in the second state, the saddle is locked and in a position to support the user, the saddle including
      a first and a second saddle pad suitable for supporting a buttocks of the user, wherein upon transition from the first state to the second state, the first and second saddle pads are brought from an orientation, in which the first and second saddle pads hang down, to a substantially horizontal orientation, the transition being a rotation of the first and the second saddle pads along an axis substantially parallel to a primary extension of the saddle, and the hinging unit including
      a lever, hinging around the support shaft, and
      extenders, extending from an end of the lever to bottoms of said saddle pads, the lever being provided with a haft for holding the lever, such that a downward movement at the haft of the lever brings about an upward rotation of the saddle pads, and wherein said extenders support the saddle pads in the second state.

2. The sitting assembly as claimed in claim 1, wherein the lever extends to a front side, so that a user can hold the lever after mounting on the vehicle.

3. The sitting assembly as claimed in claim 1, wherein the support shaft has an oblique orientation.

4. The sitting assembly as claimed in claim 1, wherein the hinging unit further comprises a top structure, the saddle or saddle pads thereof being are rotatably connected to the top structure.

5. The sitting assembly as claimed in claim 1, wherein the extenders comprise extender arms of which a first end is coupled to the saddle, and of which a second, opposed end is coupled to the lever, and wherein the first end of the arm is attached to an outer half of the saddle.

6. The sitting assembly as claimed in claim 1, wherein the lever comprises a first and a second arm extending from said connection with the support shaft and mutually including an angle of 90 to 180 degrees.

7. The sitting assembly as claimed in claim 6, wherein the angle is of 120-150 degrees.

8. The sitting assembly as claimed in claim 1, wherein the lever comprises a first and a second lever rod present on opposite sides of the support shaft, and wherein an element is present extending through or directly connected to the support shaft, so that the lever hinges on the element and rotates around the support shaft.

9. The sitting assembly as claimed in claim 1, wherein the extenders comprise support blades, which are rotatably coupled to the support shaft of the sitting assembly, and wherein the lever comprises a first and a second pushing face, attached to a first and a second of said support blades, such that when the lever is pushed downwards and hinges around the support shaft, the rotation of the lever results in rotation of both the first and the second support blade in opposite directions of rotation, the rotation of the support blades bringing about the transition of the corresponding saddle pad from the first state to the second state or vice versa.

10. Sitting assembly as claimed in claim 9, wherein the support blades are substantially triangular having a triangular diagonal extending a lower end to an upper, outer end of the support blade, the upper end being in contact with the corresponding saddle pad when in the second state, and the lower end being located at or close to a rotation axis of the lever.

11. The sitting assembly as claimed in claim 10, wherein the outer end of the support blade extends upwards in the second state and a cavity is present in the bottom of the saddle pad for locking the outer end of the support blade.

12. The sitting assembly as claimed in claim 9, wherein the support blade is not fixed to the saddle pad.

13. The sitting assembly as claimed in claim 9, wherein at least one device is present for limiting the rotation of the blade and locking the saddle pads in the second state.

14. The sitting assembly as claimed in claim 1, wherein the support shaft is a saddle pin.

15. The sitting assembly as claimed in claim 1, wherein the support shaft is a shaft provided with an interface to a saddle pin.

16. A sitting assembly designed for use on a vehicle, comprising:
   a support shaft; and
   a saddle coupled to a hinging unit, the hinging unit including a lever hinging around the support shaft and the saddle including a first and a second saddle pad suitable for supporting a buttocks of a user, the saddle being movable between a first state and a second state,
   wherein in the first state, the first and second saddle pads are in an orientation in which the first and second saddle pads hang down, and wherein, in the second state, the first and second saddle pads are locked in a substantially horizontal orientation and in a position to support the user,
   wherein, upon transition from the first state to the second state, the first and second saddle pads are brought from the orientation in which the first and second saddle pads hang down to the substantially horizontal orientation, the transition being a rotation along an axis that is substantially parallel to a primary extension of the saddle,
   wherein the saddle is supported with a support device to support the first and second saddle pads in the second state, which support device comprises support blades, which are rotatably coupled to the support shaft of the sitting assembly, and
   wherein the lever comprises a first and a second pushing face, attached to a first and a second of said support blades, such that when the lever is pushed downwards and hinges around the support shaft, the rotation of the lever results in a rotation of both the first and the second support blade in opposite directions of rotation, the rotation of the support blades bringing about the transition of the corresponding saddle pad from the first state to the second state or vice versa.

17. The sitting assembly as claimed in claim 16, wherein the support blades are substantially triangular having a triangular diagonal extending from a lower end to an upper, outer end of the support blade, the upper end bring in contact with the corresponding saddle pad when in the second state, and the lower end being located at or close to a rotation axis of the lever.

18. The sitting assembly as claimed in claim 16, wherein the support blade is not fixed to the saddle pad.

19. The sitting assembly as claimed in claim 17, wherein the outer end of the support blade extends upwards in the second state and a cavity is present in the bottom of the saddle pad for locking to outer end of the support blade.

* * * * *